US012639949B2

(12) United States Patent
Peng et al.

(10) Patent No.: US 12,639,949 B2
(45) Date of Patent: May 26, 2026

(54) CONTROL METHOD, ELECTRONIC DEVICE AND STORAGE MEDIUM

(71) Applicants: ZHEJIANG HENGYI PETROCHEMICAL CO., LTD., Hangzhou (CN); ZHEJIANG HENGYI HIGH-TECH MATERIALS CO., LTD., Hangzhou (CN)

(72) Inventors: Xiantao Peng, Hangzhou (CN); Peng Wang, Hangzhou (CN); Junliang Jin, Hangzhou (CN); Zheng Teng, Hangzhou (CN); Xuan Wu, Hangzhou (CN); Jiabo Gao, Hangzhou (CN); Haifeng Wang, Hangzhou (CN)

(73) Assignees: ZHEJIANG HENGYI PETROCHEMICAL CO., LTD., Hangzhou (CN); ZHEJIANG HENGYI HIGH-TECH MATERIALS CO., LTD., Hangzhou (CN)

(*) Notice: Subject to any disclaimer, the term of this patent is extended or adjusted under 35 U.S.C. 154(b) by 150 days.

(21) Appl. No.: 18/883,630

(22) Filed: Sep. 12, 2024

(65) Prior Publication Data
US 2025/0037465 A1     Jan. 30, 2025

Related U.S. Application Data

(63) Continuation of application No. 18/538,744, filed on Dec. 13, 2023, now Pat. No. 12,125,283.

(30) Foreign Application Priority Data
Jul. 27, 2023     (CN) .......................... 202310935861.8

(51) Int. Cl.
*G06V 20/50* (2022.01)
*B25J 9/16* (2006.01)
(Continued)

(52) U.S. Cl.
CPC ............ *G06V 20/50* (2022.01); *B25J 9/1664* (2013.01); *G06T 7/50* (2017.01); *G06T 7/73* (2017.01);
(Continued)

(58) Field of Classification Search
CPC ....... G06V 20/50; G06V 10/44; B25J 9/1664; G06T 7/50; G06T 7/73;
(Continued)

(56) References Cited

U.S. PATENT DOCUMENTS

2008/0035390 A1     2/2008   Wurz
2021/0395008 A1     12/2021  Zheng
(Continued)

FOREIGN PATENT DOCUMENTS

CN         102405394 A     4/2012
CN         204301827 U     4/2015
(Continued)

OTHER PUBLICATIONS

English Translation of CN-118696280-A (Year: 2022).*
(Continued)

*Primary Examiner* — Basil T. Jos
(74) *Attorney, Agent, or Firm* — Dority & Manning, P.A.

(57) ABSTRACT

Provided is a control method, an electronic device and a storage medium. The method comprises: when determining that a yarn spindle transported on a transport channel enters a detection area, detecting the yarn spindle located in the detection area to obtain an appearance feature of the detected yarn spindle; wherein the transport channel is a channel for transporting yarn spindles in an automatic packaging workshop; and the detection area is at least a partial area on the transport channel; when the appearance feature of the detected yarn spindle does not meet a first preset requirement, determining the yarn spindle with the
(Continued)

When determining that a yarn spindle transported on a transport channel enters a detection area, detecting the yarn spindle located in the detection area to obtain an appearance feature of the detected yarn spindle     S101

When the appearance feature of the detected yarn spindle does not meet a first preset requirement, determining the yarn spindle with the appearance feature not meeting the first preset requirement as a target yarn spindle     S102

Detecting a physical attribute feature of the target yarn spindle     S103 appearance feature not meeting the first preset requirement as a target yarn spindle; and detecting a physical attribute feature of the target yarn spindle.

20 Claims, 10 Drawing Sheets

(51) Int. Cl.
*G06T 7/50* (2017.01)
*G06T 7/73* (2017.01)
*G06V 10/44* (2022.01)

(52) U.S. Cl.
CPC .... *G06V 10/44* (2022.01); *G06T 2207/30124* (2013.01); *G06T 2207/30242* (2013.01)

(58) Field of Classification Search
CPC . G06T 2207/30124; G06T 2207/30242; G06T 7/001; B65H 63/006; B65H 67/063; G05B 19/4183; G05B 2219/45193; G05B 19/41875; Y02P 90/02; B65B 63/00; G01M 13/00; G01N 21/01; G01N 21/84; G01N 21/8806; G01N 21/8851; G01N 21/892; G01N 21/94; G01N 21/95; G01N 2021/8822; G01N 2021/8835; G01N 2021/8841; G01N 2021/8854; G01N 2021/8887; G01N 2021/945
See application file for complete search history.

(56) References Cited

U.S. PATENT DOCUMENTS

| | | | |
|---|---|---|---|
| 2022/0332505 A1 | 10/2022 | Min et al. | |
| 2023/0073479 A1 | 3/2023 | Zhou et al. | |
| 2023/0195126 A1 | 6/2023 | Ha et al. | |
| 2023/0205147 A1 | 6/2023 | Park | |
| 2023/0376046 A1 | 11/2023 | Yoon | |

FOREIGN PATENT DOCUMENTS

| | | | |
|---|---|---|---|
| CN | 205003534 U | 1/2016 | |
| CN | 105883034 A | 8/2016 | |
| CN | 106428823 A | 2/2017 | |
| CN | 108642637 A | 10/2018 | |

| | | | | |
|---|---|---|---|---|
| CN | 109520888 A | 3/2019 | | |
| CN | 109808942 A | 5/2019 | | |
| CN | 109954680 A | 7/2019 | | |
| CN | 110189809 A | 8/2019 | | |
| CN | 110813769 A | 2/2020 | | |
| CN | 111071579 A | 4/2020 | | |
| CN | 111272268 A | 6/2020 | | |
| CN | 111526760 A | 8/2020 | | |
| CN | 112348778 A | 2/2021 | | |
| CN | 112348835 A | 2/2021 | | |
| CN | 113664051 A | 11/2021 | | |
| CN | 113850862 A | 12/2021 | | |
| CN | 115196270 A | 10/2022 | | |
| CN | 115679617 A | 2/2023 | | |
| CN | 118696280 A | * | 9/2024 | ........ G05B 19/4183 |
| JP | 2010039434 A | 2/2010 | | |
| JP | 2021139775 A | 9/2021 | | |

OTHER PUBLICATIONS

Chinese Office Action (w/ English translation) for corresponding Application No. 202310935861.8, dated May 12, 2024, 22 pages.
US Notice of Allowance for corresponding U.S. Appl. No. 18/541,958, mailing date Mar. 28, 2024, 9 pages.
Japanese Decision to Grant Patent (w/ English translation) for corresponding Application No. 2023-213450, dated Feb. 20, 2024, 5 pages.
Japanese Notice of Reasons for Refusal (w/ English translation) for corresponding Application No. 2023-213450, dated Jan. 16, 2024, 8 pages.
Extended European Search Report for corresponding Application No. EP23215513, dated Jun. 3, 2024, 13 pages.
Office Action received in corresponding U.S. Appl. No. 18/538,744, dated Feb. 29, 2024, 7 pages.
Office Action (with English translation) received in corresponding Application No. CN 2023109370431, dated Jul. 15, 2025, 27 pages.
Office Action (with English translation) received in corresponding Application No. CN 202310935861.8, dated Aug. 14, 2024, 24 pages.
Yongzhao et al., "Exploration and Practice of Specialized and Innovative Integration Education in Vocational Colleges", Hebei Provincial Social Science Fund Project: Research on the High-Quality Development of Industry—University Integration Colleges in Higher Vocational College from the Perspective of Industry-Education Integration, China Commerce and Trade Press, 2023, 9 pages.

* cited by examiner

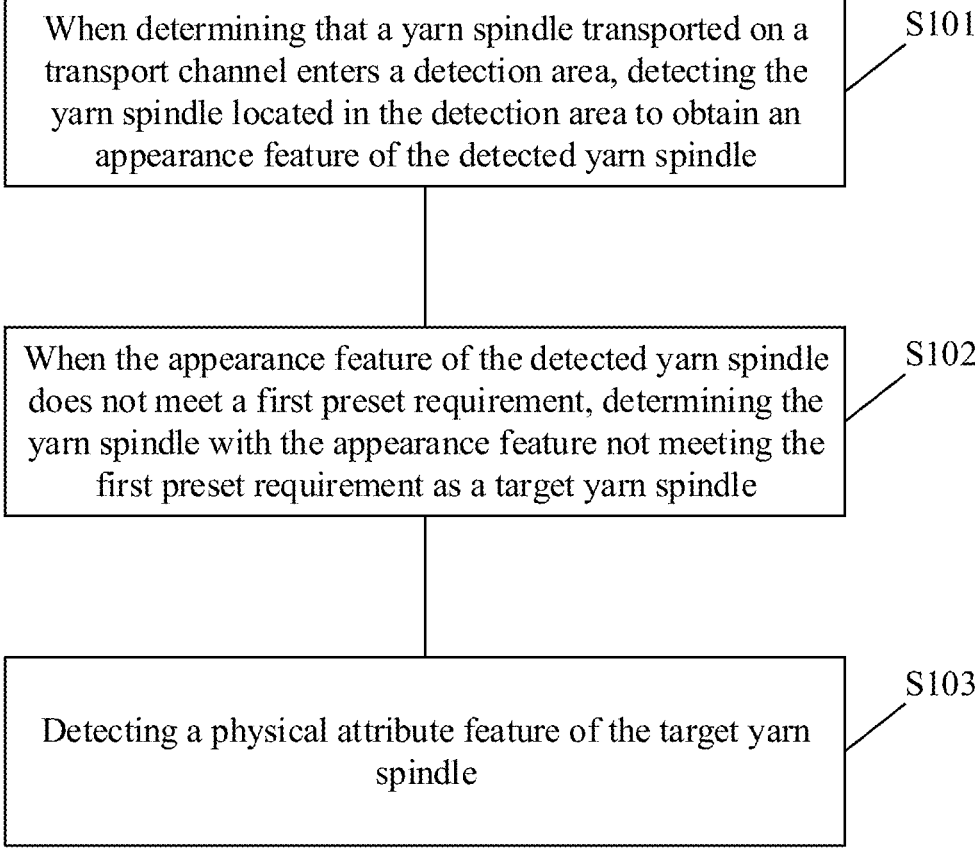

When determining that a yarn spindle transported on a transport channel enters a detection area, detecting the yarn spindle located in the detection area to obtain an appearance feature of the detected yarn spindle — S101

When the appearance feature of the detected yarn spindle does not meet a first preset requirement, determining the yarn spindle with the appearance feature not meeting the first preset requirement as a target yarn spindle — S102

Detecting a physical attribute feature of the target yarn spindle — S103

FIG. 1

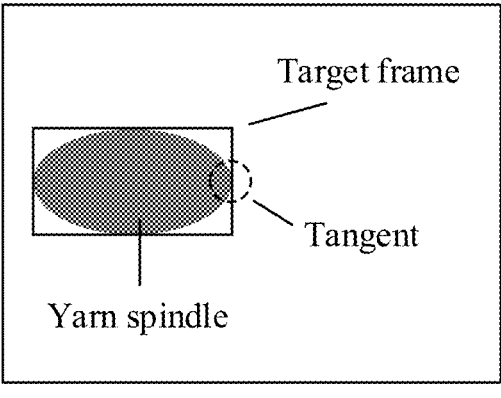

Target frame

Tangent

Yarn spindle

FIG. 2(a)

CONTROL METHOD, ELECTRONIC DEVICE AND STORAGE MEDIUM

CROSS-REFERENCE TO RELATED APPLICATIONS

This application is a Continuation of U.S. application Ser. No. 18/538,744, filed Dec. 13, 2023, which, in turn, claims priority to Chinese Patent Application No. CN202310935861.8, filed with the China National Intellectual Property Administration on Jul. 27, 2023, the disclosures both of which are hereby incorporated herein by reference in their entireties.

TECHNICAL FIELD

The present disclosure relates to a field of data processing technology, and in particular, to a control method and apparatus, a device and a storage medium.

BACKGROUND

In the automatic packaging of yarn spindles, it is necessary to detect each yarn spindle on the line, thus greatly affecting the production efficiency of yarn spindles. Therefore, a reasonable and efficient detection solution for yarn spindles is urgently needed.

SUMMARY

The present disclosure provides a control method and apparatus, a device and a storage medium, to solve or alleviate one or more technical problems in the prior art.

In a first aspect, the present disclosure provides a control method, including:

when determining that a yarn spindle transported on a transport channel enters a detection area, detecting the yarn spindle located in the detection area to obtain an appearance feature of the detected yarn spindle; wherein the transport channel is a channel for transporting yarn spindles in an automatic packaging workshop; and the detection area is at least a partial area on the transport channel;

when the appearance feature of the detected yarn spindle does not meet a first preset requirement, determining the yarn spindle with the appearance feature not meeting the first preset requirement as a target yarn spindle; and detecting a physical attribute feature of the target yarn spindle, including: obtaining the physical attribute feature of the target yarn spindle using a sensor provided in a sensing area, in a case of it is determined that the target yarn spindle enters the sensing area; wherein the sensing area is at least a partial area on the transport channel and is located downstream of the detection area;

wherein before detecting the physical attribute feature of the target yarn spindle, further including one of:

detecting whether first response information for a radio frequency identification corresponding to the target yarn spindle is obtained, in a case of the detection area and the sensing area are located in a same branch of the transport channel, wherein the first response information indicates that the target yarn spindle enters the sensing area; or detecting whether second response information for a radio frequency identification corresponding to the target yarn spindle is obtained, in a case of the detection area and the sensing area are located in different branches of the transport channel, wherein the second response information indicates that the target yarn spindle enters a branch where the sensing area is located; and determining that the target yarn spindle enters the sensing area, in a case of the second response information for the radio frequency identification corresponding to the target yarn spindle is obtained.

In a second aspect, provided is an electronic device, including: at least one processor; and a memory connected in communication with the at least one processor. The memory stores an instruction executable by the at least one processor, and the instruction, when executed by the at least one processor, enables the at least one processor to execute the method of any embodiment of the present disclosure.

In a third aspect, provided is a non-transitory computer-readable storage medium storing a computer instruction thereon, and the computer instruction is used to cause a computer to execute the method of any embodiment of the present disclosure.

In this way, the solution of the present disclosure can detect the appearance feature of the yarn spindle, and then detect the physical attribute feature of the yarn spindle when the appearance feature does not meet the condition. In other words, the solution of the present disclosure does not need to detect the physical attribute feature of each yarn spindle, thus greatly improving the detection efficiency of the physical attribute features of yarn spindles, laying the foundation for subsequent avoidance of mixing yarn spindles with abnormal physical attribute features in packaging, and also laying the foundation for subsequent improvement of the overall quality of the packaged yarn spindles.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

FIG. 1 is a first schematic flowchart of a control method according to an embodiment of the present application.

FIG. 2(a) is a schematic diagram of the positional relationship between the edge of the target frame and the framed yarn spindle according to an embodiment of the present application.

FIG. 5(*b*) is a second scenario diagram of the control method in a specific example according to an embodiment of the present application.

FIG. 6(*b*) is a third scenario diagram of the control method in a specific example according to an embodiment of the present application.

DETAILED DESCRIPTION

Figure 2B:
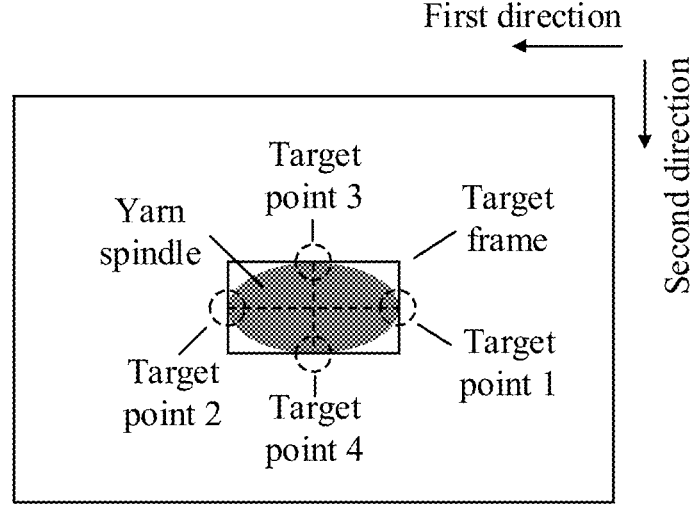
FIG. 2(b) is a schematic diagram of the positional relationship between the target frame and the framed yarn spindle under a specific perspective according to an embodiment of the present application.

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

In the automatic packaging workshop of yarn spindles, after the trolley comes online (for example, the trolley reaches a designated position), the weighing test link in the automatic packaging process needs to be carried out; in this link, the mechanical arm will grab every yarn spindle on the line for weighing, for example, place every yarn spindle in the weighing area for weighing, to obtain the weight of each yarn spindle, and thus facilitate recording the weight of each yarn spindle into the yarn spindle information table, for use in subsequent processes (such as external inspection, bagging, palletizing, etc.).

Obviously, in the above-mentioned weighing link, if every yarn spindle is weighed, the automatic packaging efficiency of yarn spindles must be greatly affected. Therefore, a reasonable and efficient detection solution for yarn spindles is urgently needed, to solve at least the above problem.

Based on this, the solution of the present disclosure proposes a control method to weigh the yarn spindles reasonably and efficiently.

Specifically, FIG. 1 is a first schematic flowchart of a control method according to an embodiment of the present application. This method is optionally applied in electronic devices, such as personal computers, servers, server clusters and other electronic devices.

Further, this method includes at least a part of the following content. As shown in FIG. 1, this method includes:

Step S101: when determining that a yarn spindle transported on a transport channel enters a detection area, detecting the yarn spindle located in the detection area to obtain an appearance feature of the detected yarn spindle.

Here, the transport channel is a channel for transporting yarn spindles in an automatic packaging workshop; and the detection area is at least a partial area on the transport channel.

In one example, the appearance feature of the yarn spindle may specifically include but not limited to one of: geometric parameters such as radius, diameter, circumference and area of the yarn spindle.

In a specific example, the appearance feature of the detected yarn spindle may be obtained in the following manner; specifically, the above step of detecting the yarn spindle located in the detection area to obtain the appearance feature of the detected yarn spindle (that is, the above step S101) specifically includes:

Step S101-1: obtaining a target image; where the target image contains the yarn spindle located in the detection area.

In one example, the target image may be obtained by an image collection component. Here, the image collection component may specifically include a camera. For example, the target image is obtained by using the camera to perform image collection on the detection area; for example, the camera is used to shoot the detection area to obtain the target image, or perform video collection on the preset area for a preset duration to obtain a plurality of continuous video frames, and select one image from the continuous video frames as the target image.

Step S101-2: inputting the target image into a target detection model to obtain the coordinate information of a target point in a target frame.

Here, the target detection model is used to obtain a target frame that frames each yarn spindle located in the detection area in the target image, and determine a coordinate point in the target frame (for example, in the sides of the target frame) having a preset position relationship with a shape of the framed yarn spindle based on the coordinate information of the target frame.

Further, the sides of the target frame have the preset position relationship with the shape of the framed yarn spindle. For example, the yarn spindle is oval or circular. At this time, as shown in FIG. 2(*a*), the preset position relationship may specifically mean that the sides of the target frame are tangent to the shape of the framed yarn spindle.

Further, a number of target frames is related to a number of yarn spindles located in the detection area in the target image. For example, one target frame is used to frame one yarn spindle in the detection area. At this time, the number of target frames is the same as the number of yarn spindles located in the detection area.

Step S101-3: obtaining the appearance feature of the yarn spindle framed by the target frame based on the coordinate information of the target point in the target frame.

In an example, the coordinate information of the target point in the target frame may be used to obtain the geometric parameters of the yarn spindle framed by the target frame, for example, the radius, diameter, circumference, area, etc. of the yarn spindle framed by the target frame, which are not limited in the solution of the present disclosure.

For example, FIG. 2(*b*) is a schematic diagram of a target frame containing a yarn spindle. In this example, the yarn spindle is circular, and the image of the yarn spindle framed by the target frame is obtained by collecting the detection area through the camera at a specific viewing angle. At this time, the coordinate information of the target point may be obtained based on the target detection model described above, for example, the coordinate information of the target point 1 to the coordinate information of the target point 4 are obtained, and then the length between the target points on the opposite sides of the target frame can be calculated. For example, the length between the target point 1 and the target point 2 is obtained, and/or, the length between the target point 3 and the target point 4 is obtained. Further, the diameter of the yarn spindle framed by the target frame may be obtained based on the calculated length between the target points on the opposite sides of the target frame and a conversion coefficient corresponding to the specific viewing angle described above; for example, the length between the target point 1 and the target point 2 may be calculated by using the coordinate information of the target point 1 and the coordinate information of the target point 2, and multiplied by a conversion coefficient corresponding to the first direction (the direction of the connection line of the target point 1 and the target point 2) under the specific viewing angle, to obtain the diameter of the yarn spindle framed by the target frame. Alternatively, the length between the target point 3 and the target point 4 may be calculated by using the coordinate information of the target point 3 and the coordinate information of the target point 4, and multiplied by a conversion coefficient corresponding to the second direction (the direction of the connection line of the target point 3 and the target point 4) under the specific viewing angle, to obtain the diameter of the yarn spindle framed by the target frame.

Here, it should be noted that, in practical applications, the camera is preset, so the above-mentioned conversion coefficient can be determined after the setting is completed. Here, the method of determining the conversion system is not limited in the solution of the present disclosure.

Further, in a specific example, the target detection model in step S101-2 described above includes at least a first network layer, a second network layer, and a third network layer.

Here, the first network layer is used to extract an image feature of the target image, and obtain candidate frames for framing each yarn spindle in the target image based on the image feature of the target image.

Further, the second network layer is used to determine first center positions of the candidate frames based on coordinate information of the candidate frames, and select a candidate frame of which a first center position has a position relationship with a preset center position of the detection area satisfying a preset relationship, to obtain the target frame. For example, a candidate frame that satisfies the preset relationship is used as the target frame.

Further, the third network layer is used to determine the coordinate information of the target point in the target frame having the preset position relationship with the shape of the framed yarn spindle based on the coordinate information of the target frame.

Step S102: when the appearance feature of the detected yarn spindle does not meet a first preset requirement, determining the yarn spindle with the appearance feature not meeting the first preset requirement as a target yarn spindle.

Here, the first preset requirement may be specifically that the appearance feature of the yarn spindle is within a preset first numerical interval; and further, the first numerical interval may be set according to actual production conditions, for example, the setting of the first numerical interval is related to the type of the yarn spindle produced.

Further, in a specific example, the appearance feature of the yarn spindle is the diameter of the yarn spindle. Correspondingly, the first preset requirement may be that the diameter of the yarn spindle is within the preset first numerical interval.

In a specific example, after detecting the yarn spindle located in the detection area to obtain the appearance feature of the detected yarn spindle, the control method further includes:

when the appearance feature of the detected yarn spindle meets the first preset requirement, determining a preset physical feature (for example, a preset value) as the yarn spindle information of the yarn spindle with the appearance feature meeting the first preset requirement.

It should be pointed out that the preset physical feature may be specifically a physical attribute feature value of a standard yarn spindle, and the standard yarn spindle is a yarn spindle that meets production requirements; and further, the preset physical feature may be specifically a value of other attribute feature than the appearance feature of the standard yarn spindle, for example, the weight of the standard yarn spindle, etc. Here, the specific setting of the preset physical feature is related to the type of the yarn spindle produced, actual needs, etc., and is not limited in the solution of the present disclosure.

It should be pointed out that there is an association relationship between the appearance feature of the yarn spindle and the physical attribute feature of the yarn spindle. Based on this, the physical attribute feature of the yarn spindle may be estimated by using the obtained appearance feature of the yarn spindle; for example, the weight of the yarn spindle may be estimated by using the obtained diameter of the yarn spindle, thus further improving the detection efficiency of the yarn spindle.

For example, taking the detection of the diameter of the transported yarn spindle as an example, after obtaining the diameter of the detected yarn spindle, it is judged whether the diameter of the detected yarn spindle meets the first preset requirement, for example, whether the diameter is within the preset first numerical interval; if so, the standard weight of the standard yarn spindle is directly used as the yarn spindle information of the yarn spindle with the diameter meeting the first preset requirement; otherwise, that is, when the diameter of the detected yarn spindle does not meet the first preset requirement, it is determined that the yarn spindle with the diameter not meeting the first preset requirement is a yarn spindle with abnormal weight. At this time, the yarn spindle with abnormal weight can be used as the target spindle.

Alternatively, in another example, taking the detection of the cross-sectional area of the transported yarn spindle as an example, after obtaining the cross-sectional area of the detected yarn spindle, it is judged whether the cross-sectional area of the detected yarn spindle meets the first preset requirement, for example, whether the cross-sectional area is within the preset first numerical interval; if so, the standard weight of the standard yarn spindle is directly used as the yarn spindle information of the yarn spindle with the cross-sectional area meeting the first preset requirement; otherwise, that is, when the cross-sectional area of the detected yarn spindle does not meet the first preset requirement, it is determined that the yarn spindle with the cross-sectional area not meeting the first preset requirement is a yarn spindle with abnormal weight. At this time, the yarn spindle with abnormal weight can be used as the target spindle.

Step S103: detecting a physical attribute feature of the target yarn spindle.

In one example, the physical attribute feature of the yarn spindle specifically include the weight of the yarn spindle.

In a specific example, after detecting the physical attribute feature of the target yarn spindle (that is, the above step S103), the method further includes:

generating a second control instruction for the target yarn spindle when the physical attribute feature of the target yarn spindle does not meet a second preset requirement, where the second control instruction is used to instruct a mechanical arm to grab the target yarn spindle and place the target yarn spindle on a target trolley. Here, the target trolley is a specific trolley for placing the yarn spindle with the physical attribute feature not meeting the second preset requirement.

Alternatively, in another specific example, when the physical attribute feature of the target yarn spindle meets the second preset requirement, the physical attribute feature of the target yarn spindle may be directly used as the yarn spindle information of the target yarn spindle.

Here, the second preset requirement may be specifically that the physical attribute feature of the yarn spindle is within a preset second numerical interval. Here, the second numerical interval may be set according to actual production conditions, for example, the setting of the second numerical interval is related to the type of the yarn spindle produced, etc., and is not limited in the solution of the present disclosure.

For example, after detecting the physical attribute feature of the target yarn spindle, such as the weight of the target yarn spindle, it is judged whether the weight of the target yarn spindle meets the second preset requirement, for example, whether the weight is within the preset second numerical interval; if so, the detected weight of the target yarn spindle is directly used as the yarn spindle information of the target yarn spindle; otherwise, that is, when the weight of the target yarn spindle does not meet the second preset requirement, the second control instruction is generated to instruct the mechanical arm to grab the target yarn spindle and place the target yarn spindle on the target trolley, thus effectively avoiding the problem that the yarn spindle with abnormal weight is mixed in yarn spindle packaging.

In this way, the solution of the present disclosure can detect the appearance feature of the yarn spindle, and determine whether it is necessary to detect the physical attribute feature of the yarn spindle based on the appearance feature. For example, when the appearance feature of the yarn spindle meets the first preset requirement, the detection is not needed; and when the appearance feature of the yarn spindle does not meet the first preset requirement, the physical attribute feature of the yarn spindle is detected. Therefore, the solution of the present disclosure can obtain the physical attribute features of all yarn spindles without detecting the physical attribute feature of each yarn spindle, greatly improving the detection efficiency of the physical attribute features of yarn spindles, laying the foundation for subsequent avoidance of mixing yarn spindles with abnormal physical attribute features in packaging, and also laying the foundation for subsequent improvement of the overall quality of the packaged yarn spindles.

In addition, the solution of the present disclosure can be applied to the weighing link of the automatic packaging process. At this time, the physical attribute feature is weight. In this link, the solution of the present disclosure can be used to quickly determine the weight of each yarn spindle without weighing each yarn spindle, thus greatly improving the processing efficiency of the weighing link of yarn spindles.

In a specific example of the solution of the present disclosure, the physical attribute feature of the target yarn spindle may be obtained in the following manner; specifically, the above step of detecting the physical attribute feature of the target yarn spindle (that is, the above step S103) specifically includes:

obtaining the physical attribute feature of the target yarn spindle using a sensor provided in a sensing area when determining that the target yarn spindle enters the sensing area.

Figure 3A:
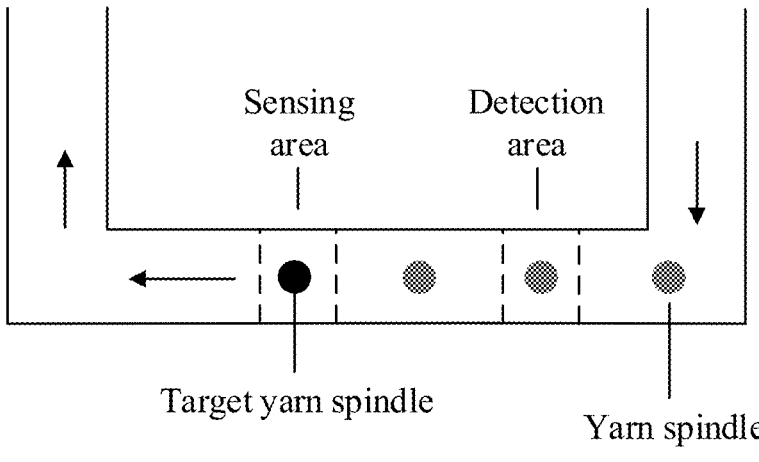
FIG. 3(a) and FIG. 3(b) are scenario diagrams of the control method in an example according to an embodiment of the present application.
Figure 3B:
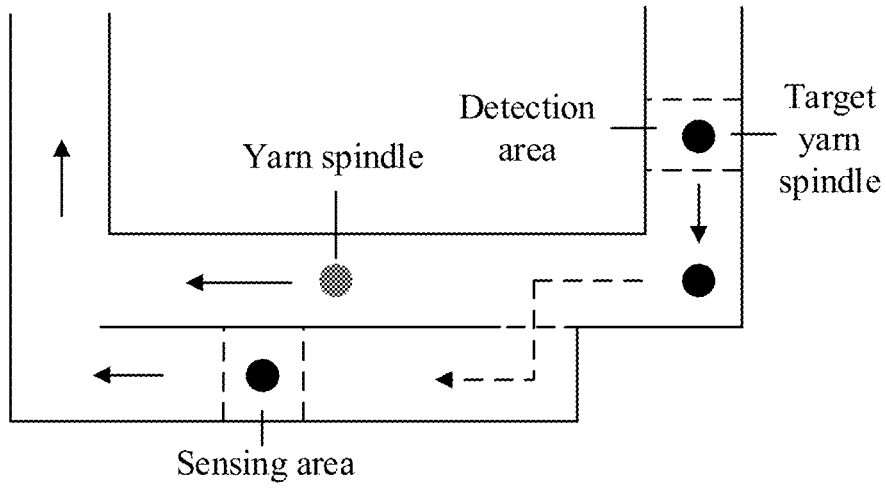

Here, the sensing area is at least a partial area on the transport channel and is located downstream of the detection area; for example, as shown in FIG. 3(a) or FIG. 3(b), the transport channel moves in the clockwise direction, and at this time, the sensing area is located downstream of the detection area in terms of the direction of transmission of the transport channel. In this way, it is convenient to transport the target yarn spindle that needs to be detected to the sensing area, so as to complete the detection in the sensing area.

In a specific example of the solution of the present disclosure, before detecting the physical attribute feature of the target yarn spindle, the following methods may be used to determine whether the target yarn spindle enters the sensing area, specifically including one of:

(1) Detecting whether the first response information for a radio frequency identification corresponding to the target yarn spindle is obtained when the detection area and the sensing area are located in a same branch of the transport channel, where the first response information indicates that the target yarn spindle enters the sensing area.

For example, when the first response information for the radio frequency identification corresponding to the target yarn spindle is obtained, it is considered that the target yarn spindle enters the sensing area; and correspondingly, when the first response information for the radio frequency identification corresponding to the target yarn spindle is not obtained, it is considered that the target yarn spindle does not enter the sensing area.

Figure 4A:
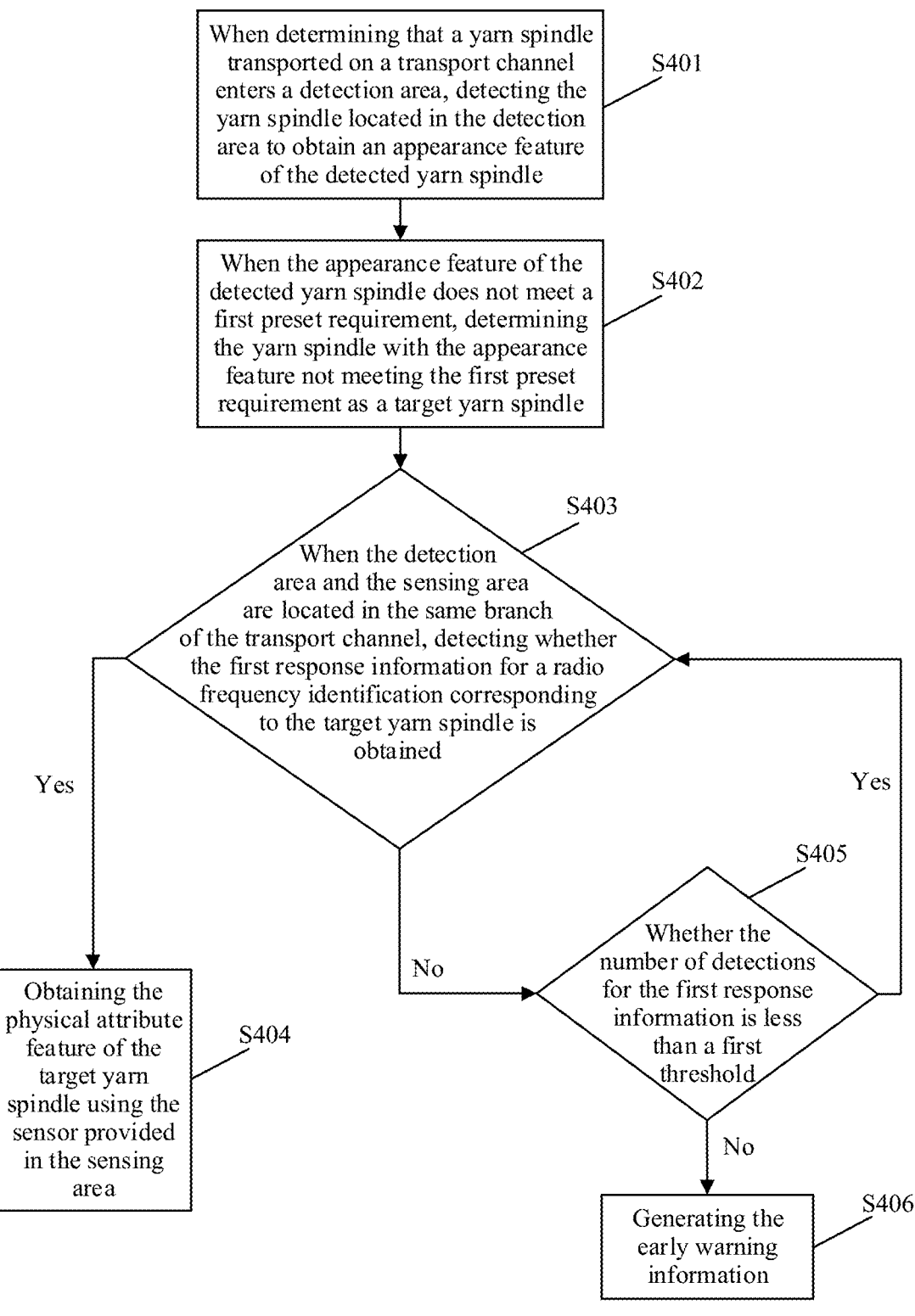
FIG. 4(a) is a second schematic flowchart of a control method according to an embodiment of the present application.

Specifically, FIG. 4(a) is a second schematic flowchart of a control method according to an embodiment of the present application. This method is optionally applied in electronic devices, such as personal computers, servers, server clusters and other electronic devices. It can be understood that the relevant content of the method shown in FIG. 1 described above may also be applied to this example, and the relevant content will not be repeated in this example.

Further, this method includes at least a part of the following content. As shown in FIG. 4(a), this method includes:

Step S401: when determining that a yarn spindle transported on a transport channel enters a detection area, detecting the yarn spindle located in the detection area to obtain an appearance feature of the detected yarn spindle.

Here, the transport channel is a channel for transporting yarn spindles in an automatic packaging workshop; and the detection area is at least a partial area on the transport channel.

Step S402: when the appearance feature of the detected yarn spindle does not meet a first preset requirement, determining the yarn spindle with the appearance feature not meeting the first preset requirement as a target yarn spindle.

Step S403: when the detection area and the sensing area are located in the same branch of the transport channel, detecting whether the first response information for the radio frequency identification corresponding to the target yarn spindle is obtained. If so, that is, when the first response information for the radio frequency identification corresponding to the target yarn spindle is obtained, step S404 is executed; otherwise, that is, when the first response information for the radio frequency identification corresponding to the target yarn spindle is not obtained, step S405 is executed.

Here, the first response information indicates that the target yarn spindle enters the sensing area; and the sensing area is at least a partial area on the transport channel and is located downstream of the detection area. For the relevant content of this part, reference may be made to the above description, which will not be repeated here.

Figure 4B:
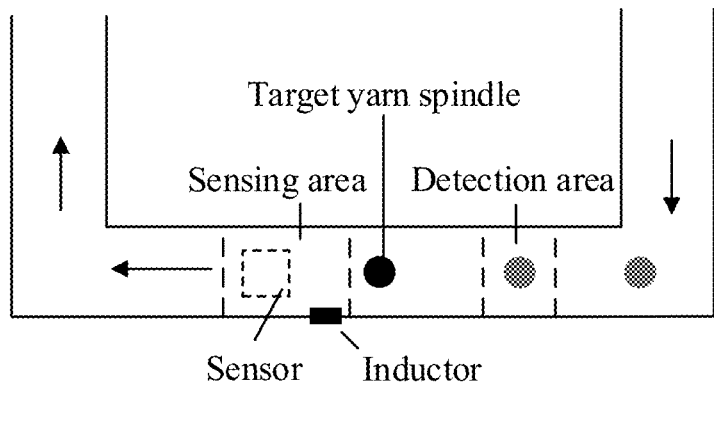
FIG. 4(*b*) is a first scenario diagram of the control method in a specific example according to an embodiment of the present application.

In a specific example, within the sensing area, for example, as shown in FIG. 4(b), a sensor (for example, an inductive card reader) is provided at the initial position of the sensing area in the transportation direction of the transport channel, for example, in the clockwise direction. Correspondingly, an identification card that can be sensed by the sensor, for example, a radio frequency identifier (such as Radio Frequency Identification (RFID) card) that can be identified by the inductive card reader, is provided on the target yarn spindle or on a yarn placement tray on which the target yarn spindle is placed. At this time, when the target yarn spindle is transmitted to the area that the sensor can sense, the sensor will generate a signal, that is, generate the first response information, and transmit the first response information to a control apparatus. Correspondingly, after obtaining the first response information, the control apparatus can consider that the target yarn spindle enters the sensing area, thereby facilitating the subsequent detection process.

Step S404: obtaining the physical attribute feature of the target yarn spindle using the sensor provided in the sensing area.

Further, in a specific example, when the detection area and the sensing area are located in the same branch of the transport channel, before step S404, the method further includes: generating a first control instruction when the first response information for the radio frequency identification corresponding to the target yarn spindle is obtained, where the first control instruction is used to instruct the sensor provided in the sensing area to enter a working state. In this way, the physical attribute feature of the target yarn spindle can be obtained using the sensor provided in the sensing area in working state. At the same time, since the solution of the present disclosure can trigger the sensor to enter the working state only when the sensor needs to be activated, the power resources can be saved while effectively improving the packaging efficiency of yarn spindles, laying the foundation for further improving the overall production efficiency of yarn spindles.

Step S405: judging whether the number of detections for the first response information recorded by a counter is less than a first threshold. If so, return to step S403; otherwise, execute step S406.

It can be understood that a counter may be set in practical applications, and the initial number of counts on the counter is set to 0. After the process of detecting whether the first response information of the radio frequency identification corresponding to the target yarn spindle is obtained is executed once, the number of counts on the counter is incremented by one. The counter stops counting until it is detected that the number of counts for the first response information is greater than or equal to the first threshold. In this way, the early warning information can be quickly generated when the first response information is not detected for multiple consecutive times, so that the worker can maintain the device in time.

Here, the first threshold is an empirical value and can be set according to actual needs, and is not limited in the solution of the present disclosure.

Step S406: generating the early warning information to prompt a worker, to facilitate the worker to perform the device detection.

For example, as shown in FIG. 4(b), the yarn spindle located in the detection area is detected to obtain the appearance feature of the detected yarn spindle, such as the diameter of the detected yarn spindle; it is judged whether the diameter of the detected yarn spindle meets the first preset requirement; if so, the standard weight of the standard yarn spindle is directly used as the yarn spindle information of the yarn spindle with the diameter meeting the first preset requirement; otherwise, the yarn spindle with abnormal weight may be used as the target yarn spindle, to continue transporting the target yarn spindle. Further, it is detected whether the first response information for the radio frequency identification corresponding to the target yarn spindle is obtained; if so, it means that the target yarn spindle has entered the sensing area, and at this time, the weighing sensor provided in the sensing area is started to make the weighing sensor provided in the sensing area enter the working state, so as to obtain the weight of the target yarn spindle based on the weighing sensor in the working state; otherwise, the counter is used to obtain the number of detections for the first response information, and it is judged whether the number of detections for the first response information is less than the first threshold; if so, it is re-detected whether the first response information is obtained; otherwise, the early warning information is generated.

(2) Detecting whether the second response information for the radio frequency identification corresponding to the target yarn spindle is obtained when the detection area and the sensing area are located in different branches of the transport channel, where the second response information indicates that the target yarn spindle enters a branch where the sensing area is located; and determining that the target yarn spindle enters the sensing area when the second response information for the radio frequency identification corresponding to the target yarn spindle is obtained.

It should be noted that, in this example, when the detection area and the sensing area are located in different branches of the transport channel, and when the target yarn spindle enters the branch where the sensing area is located, the target yarn spindle is deemed to have entered the sensing area.

For example, when the second response information for the radio frequency identification corresponding to the target yarn spindle is obtained, it is considered that the target yarn spindle enters the branch where the sensing area is located, that is, it is determined that the target yarn spindle enters the sensing area; and correspondingly, when the second response information for the radio frequency identification corresponding to the target yarn spindle is not obtained, it is considered that the target yarn spindle does not enter the branch where the sensing area is located, that is, the target yarn spindle does not enter the sensing area.

Figure 5A:
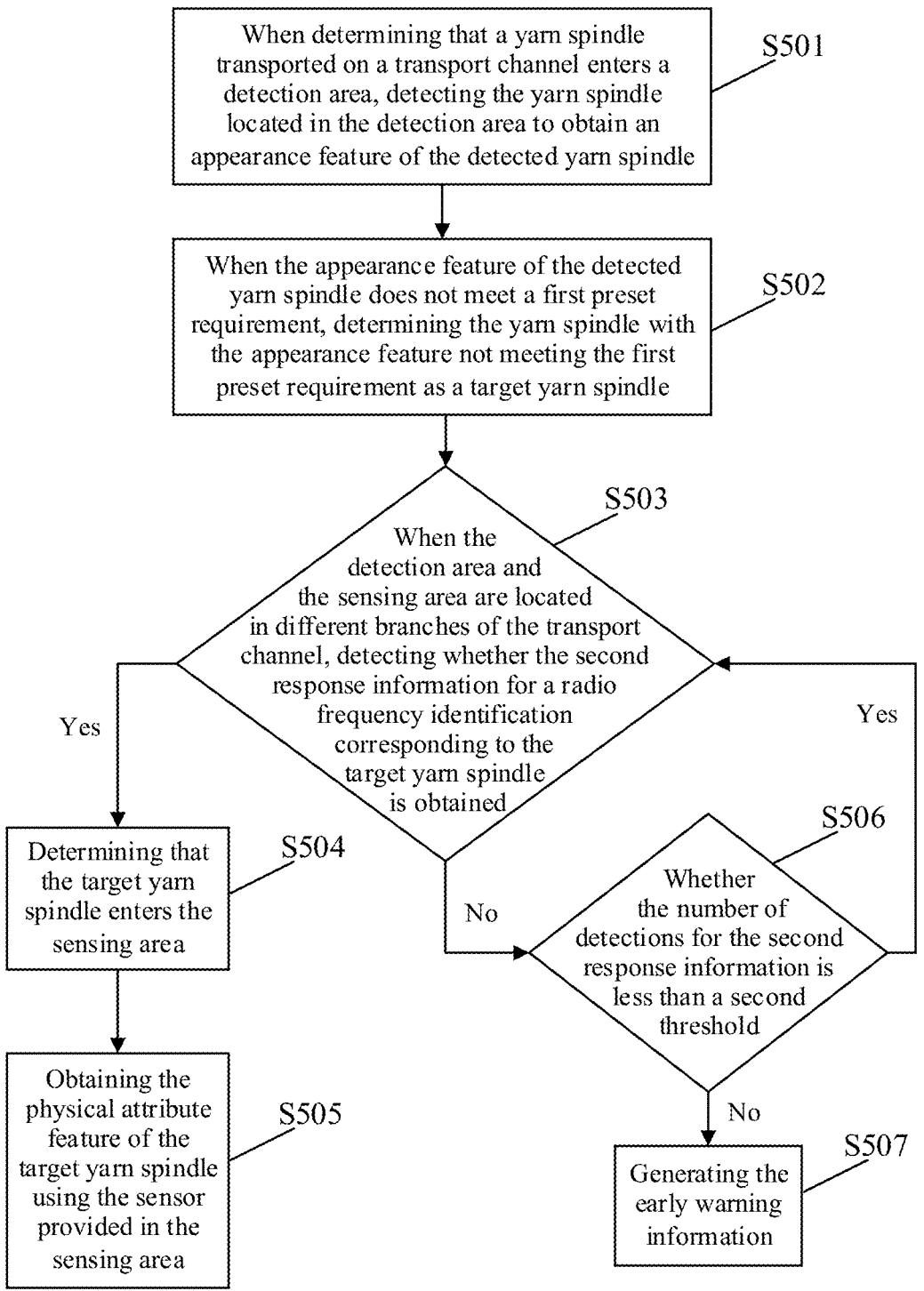
FIG. 5(*a*) is a third schematic flowchart of a control method according to an embodiment of the present application.

Specifically, FIG. 5(a) is a third schematic flowchart of a control method according to an embodiment of the present application. This method is optionally applied in electronic devices, such as personal computers, servers, server clusters and other electronic devices. It can be understood that the relevant content of the method shown in FIG. 1 described above may also be applied to this example, and the relevant content will not be repeated in this example.

Further, this method includes at least a part of the following content. As shown in FIG. 5(a), this method includes:

Step S501: when determining that a yarn spindle transported on a transport channel enters a detection area, detecting the yarn spindle located in the detection area to obtain an appearance feature of the detected yarn spindle.

Here, the transport channel is a channel for transporting yarn spindles in an automatic packaging workshop; and the detection area is at least a partial area on the transport channel.

Step S502: when the appearance feature of the detected yarn spindle does not meet a first preset requirement, determining the yarn spindle with the appearance feature not meeting the first preset requirement as a target yarn spindle.

In a specific example, when the detection area and the sensing area are located in different branches of the transport channel, the branch that the target yarn spindle needs to pass through may also be adjusted from a default branch to a target branch after step S502 (that is, determining the target yarn spindle), so that the target yarn spindle with the appearance feature not meeting the first preset requirement is transported to the sensing area via the target branch. That is to say, the branch that the yarn spindle with the physical attribute feature to be further detected needs to pass through is adjusted from the default branch to the target branch.

Here, the default branch represents a branch in the transport channel to transport a yarn spindle with an appearance feature meeting the first preset requirement; and the target branch is the branch where the sensing area is located, and represents a branch in the transport channel to transport a yarn spindle with an appearance feature not meeting the first preset requirement.

Further, the sensing area is at least a partial area on the transport channel and is located downstream of the detection area. For the relevant content of this part, reference may be made to the above description, which will not be repeated here.

Step S503: when the detection area and the sensing area are located in different branches of the transport channel, detecting whether the second response information for the radio frequency identification corresponding to the target yarn spindle is obtained. If so, that is, when the second response information for the radio frequency identification corresponding to the target yarn spindle is obtained, step S504 is executed. Otherwise, that is, when the second response information for the radio frequency identification corresponding to the target yarn spindle is not obtained, step S506 is executed.

Here, the second response information indicates that the target yarn spindle enters the branch where the sensing area is located.

Here, it should be noted that, in practical applications, the adjustment step of adjusting the branch that the target yarn spindle needs to pass through from the default branch to the target branch may be executed simultaneously with the detection step of detecting whether the second response information for the radio frequency identification corresponding to the target yarn spindle is obtained, or the adjustment step may be executed before the detection step.

Step S504: determining that the target yarn spindle enters the sensing area. Step S505 is executed.

In a specific example, when the second response information for the radio frequency identification corresponding to the target yarn spindle is obtained, it can be considered that the target yarn spindle enters the sensing area. At this time, a first control instruction may further be generated, to trigger the sensor provided in the sensing area to enter the working state. That is to say, when the detection area and the sensing area are located in different branches of the transport channel, and when the second response information for the radio frequency identification corresponding to the target yarn spindle is obtained, a first control instruction may be generated; where the first control instruction is used to instruct the sensor provided in the sensing area to enter the working state. In this way, it is convenient to obtain the physical attribute feature of the target yarn spindle using the sensor provided in the sensing area in working state. At the same time, since the solution of the present disclosure can trigger the sensor to enter the working state only when the sensor needs to be activated, the power resources can be saved while effectively improving the packaging efficiency of yarn spindles, laying the foundation for further improving the overall production efficiency of yarn spindles.

In a specific example, on the branch where the sensing area is located (that is, the target branch mentioned above), for example, as shown in FIG. 5(b), a sensor (for example, an inductive card reader) is provided at the initial position of the target branch in the transportation direction of the transport channel, for example, in the clockwise direction. Correspondingly, an identification card that can be sensed by the sensor, for example, a radio frequency identifier (such as RFID card) that can be identified by the inductive card reader, is provided on the target yarn spindle or on a yarn placement tray on which the target yarn spindle is placed. At this time, when the target yarn spindle is transmitted to the area that the sensor corresponding to the target branch can sense, the sensor will generate a signal, that is, generate the second response information, and transmit the second response information to the control apparatus. Correspondingly, after obtaining the second response information, the control apparatus can consider that the target yarn spindle enters the branch where the sensing area is located, and then consider that the target yarn spindle enters the sensing area, thus facilitating the subsequent detection process.

Step S505: obtaining the physical attribute feature of the target yarn spindle using the sensor provided in the sensing area.

Step S506: judging whether the number of detections for the second response information recorded by a counter is less than a second threshold. If so, return to step S503; otherwise, execute step S507.

It can be understood that a counter may also be set in practical applications, and the initial number of counts on the counter is set to 0. After the process of detecting whether the second response information of the radio frequency identification corresponding to the target yarn spindle is obtained is executed once, the number of counts on the counter is incremented by one. The counter stops counting for the second response information until it is detected that the number of counts for the second response information is greater than or equal to the second threshold. In this way, the early warning information can be quickly generated when the second response information is not detected for multiple consecutive times, so that the worker can maintain the device in time.

Here, the second threshold is an empirical value and can be set according to actual needs, and is not limited in the solution of the present disclosure.

Step S507: generating the early warning information to prompt a worker, to facilitate the worker to perform the device detection.

Figure 5B:
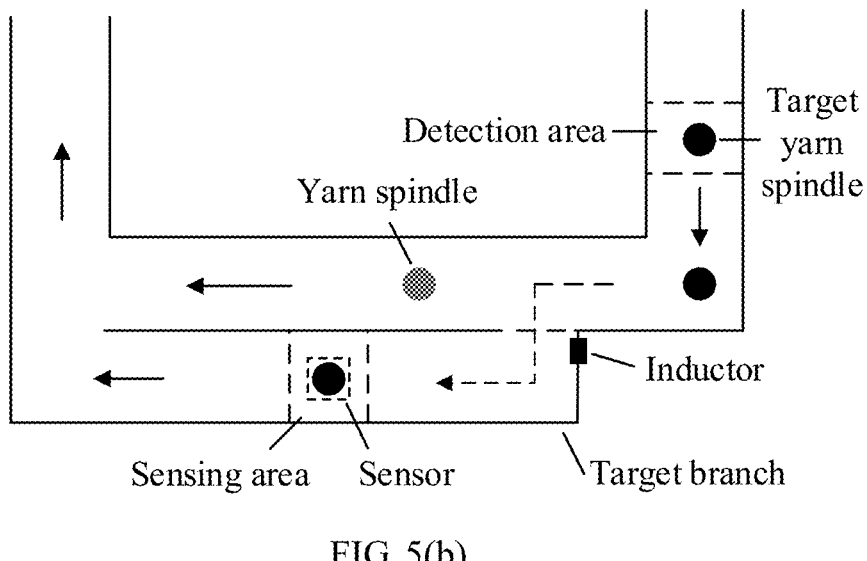

For example, as shown in FIG. 5(b), the yarn spindle located in the detection area is detected to obtain the appearance feature of the detected yarn spindle, such as the diameter of the detected yarn spindle; it is judged whether the diameter of the detected yarn spindle meets the first preset requirement; if so, the standard weight of the standard yarn spindle is directly used as the yarn spindle information of the yarn spindle with the diameter meeting the first preset requirement; otherwise, the yarn spindle with abnormal weight may be used as the target yarn spindle, and the branch that the target yarn spindle needs to pass through is adjusted from the default branch to the target branch, to continue transporting the target yarn spindle. Further, it is detected whether the second response information for the radio frequency identification corresponding to the target yarn spindle is obtained; if so, it is considered that the target yarn spindle has entered the branch where the sensing area is located (that is, the target branch), and then it is considered that the target yarn spindle has entered the sensing area, and at this time, the weighing sensor provided in the sensing area is started to make the weighing sensor provided in the sensing area enter the working state, so as to obtain the weight of the target yarn spindle based on the weighing sensor in the working state; otherwise, the counter is used to obtain the number of detections for the second response information, and it is judged whether the number of detections for the second response information is less than the second threshold; if so, it is re-detected whether the second response information is obtained; otherwise, the early warning information is generated.

(3) Detecting whether the second response information for the radio frequency identification corresponding to the target yarn spindle is obtained when the detection area and the sensing area are located in different branches of the transport channel, where the second response information indicates that the target yarn spindle enters a branch where the sensing area is located; detecting whether the third response information for the radio frequency identification corresponding to the target yarn spindle is obtained when the second response information for the radio frequency identification corresponding to the target yarn spindle is obtained, where the third response information indicates that the target yarn spindle enters the sensing area; and determining that the target yarn spindle enters the sensing area when the third response information for the radio frequency identification corresponding to the target yarn spindle is obtained.

It should be noted that, in this example, when the detection area and the sensing area are located in different branches of the transport channel, and when the target yarn spindle enters the branch where the sensing area is located and enters the sensing area, the target yarn spindle will be deemed to have entered the sensing area.

For example, when the second response information for the radio frequency identification corresponding to the target yarn spindle is obtained, it is considered that the target yarn spindle enters the branch where the sensing area is located; and further, it is also necessary to obtain the third response information for the radio frequency identification corresponding to the target yarn spindle. At this time, it can be considered that the target yarn spindle enters the sensing area. Accordingly, when the second response information for the radio frequency identification corresponding to the target yarn spindle is obtained but the third response information for the radio frequency identification corresponding to the target yarn spindle has not been obtained, it will not be considered that the target yarn spindle has not entered the sensing area.

Figure 6A:
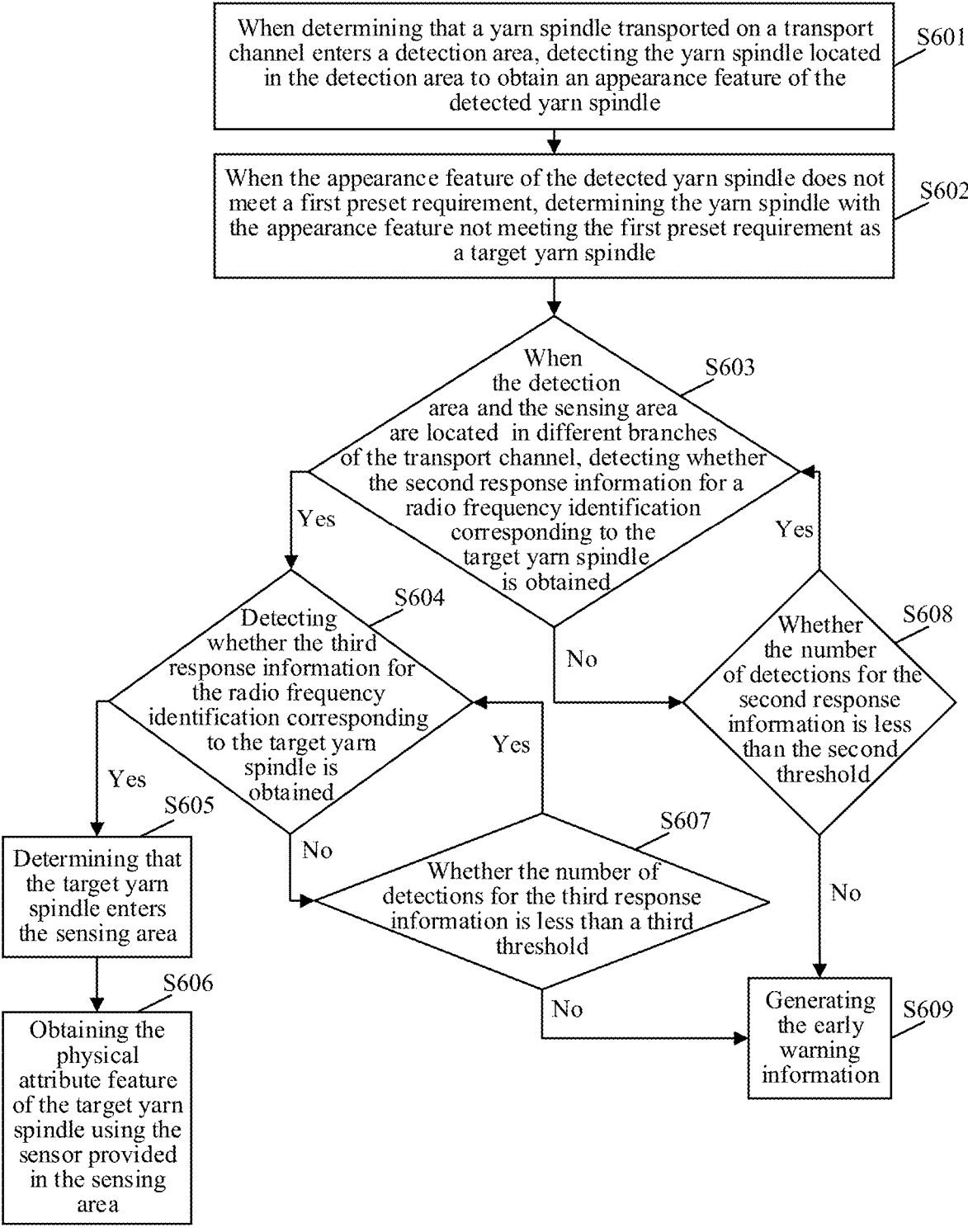
FIG. 6(*a*) is a fourth schematic flowchart of a control method according to an embodiment of the present application.

Specifically, FIG. 6(a) is a fourth schematic flowchart of a control method according to an embodiment of the present application. This method is optionally applied in electronic devices, such as personal computers, servers, server clusters and other electronic devices. It can be understood that the relevant content of the method shown in FIG. 1 described above may also be applied to this example, and the relevant content will not be repeated in this example.

Further, this method includes at least a part of the following content. As shown in FIG. 6(a), this method includes:

Step S601: when determining that a yarn spindle transported on a transport channel enters a detection area, detecting the yarn spindle located in the detection area to obtain an appearance feature of the detected yarn spindle.

Here, the transport channel is a channel for transporting yarn spindles in an automatic packaging workshop; and the detection area is at least a partial area on the transport channel.

Step S602: when the appearance feature of the detected yarn spindle does not meet a first preset requirement, determining the yarn spindle with the appearance feature not meeting the first preset requirement as a target yarn spindle.

In a specific example, when the detection area and the sensing area are located in different branches of the transport channel, the branch that the target yarn spindle needs to pass through may also be adjusted from a default branch to a target branch after step S602 of determining the target yarn spindle, so that the target yarn spindle with the appearance feature not meeting the first preset requirement is transported to the sensing area via the target branch. That is to say, the branch that the yarn spindle with the physical attribute feature to be further detected needs to pass through is adjusted from the default branch to the target branch.

Here, the default branch represents a branch in the transport channel to transport a yarn spindle with an appearance feature meeting the first preset requirement; and the target branch is the branch where the sensing area is located, and represents a branch in the transport channel to transport a yarn spindle with an appearance feature not meeting the first preset requirement.

Further, the sensing area is at least a partial area on the transport channel and is located downstream of the detection area. For the relevant content of this part, reference may be made to the above description, which will not be repeated here.

Step S603: when the detection area and the sensing area are located in different branches of the transport channel, detecting whether the second response information for the radio frequency identification corresponding to the target yarn spindle is obtained. If so, that is, when the second response information for the radio frequency identification corresponding to the target yarn spindle is obtained, step S604 is executed. Otherwise, that is, when the second response information for the radio frequency identification corresponding to the target yarn spindle is not obtained, step S608 is executed.

Here, the second response information indicates that the target yarn spindle enters the branch where the sensing area is located.

Here, it should be noted that, in practical applications, the adjustment step of adjusting the branch that the target yarn spindle needs to pass through from the default branch to the target branch may be executed simultaneously with the detection step of detecting whether the second response information for the radio frequency identification corresponding to the target yarn spindle is obtained, or the adjustment step may be executed before the detection step.

Step S604: detecting whether the third response information for the radio frequency identification corresponding to the target yarn spindle is obtained. If so, that is, when the third response information for the radio frequency identification corresponding to the target yarn spindle is obtained, step S605 is executed; otherwise, that is, when the third response information for the radio frequency identification corresponding to the target yarn spindle is not obtained, step S607 is executed.

Here, the third response information indicates that the target yarn spindle enters the sensing area.

Step S605: determining that the target yarn spindle enters the sensing area. Step S606 is executed.

In a specific example, when the second response information and the third response information for the radio frequency identification corresponding to the target yarn spindle are obtained, it can be considered that the target yarn spindle enters the sensing area. At this time, a first control instruction may further be generated, to trigger the sensor provided in the sensing area to enter the working state. That is to say, when the detection area and the sensing area are located in different branches of the transport channel, and when the second response information for the radio frequency identification corresponding to the target yarn spindle and the third response information for the radio frequency identification corresponding to the target yarn spindle are obtained, a first control instruction may be generated; where the first control instruction is used to instruct the sensor provided in the sensing area to enter the working state. In this way, it is convenient to obtain the physical attribute feature of the target yarn spindle using the sensor provided in the sensing area in working state. At the same time, since the solution of the present disclosure can trigger the sensor to enter the working state only when the sensor needs to be activated, the power resources can be saved while effectively improving the packaging efficiency of yarn spindles, laying the foundation for further improving the overall production efficiency of yarn spindles.

In a specific example, on the branch where the sensing area is located (that is, the target branch mentioned above), for example, as shown in FIG. 6(b), a sensor (for example, an inductive card reader) is provided at the initial position of the target branch in the transportation direction of the transport channel, for example, in the clockwise direction. Correspondingly, an identification card that can be sensed by the sensor, for example, a radio frequency identifier (such as RFID card) that can be identified by the inductive card reader, is provided on the target yarn spindle or on a yarn placement tray on which the target yarn spindle is placed. At this time, when the target yarn spindle is transmitted to the area that the sensor can sense, the sensor will generate a signal, that is, generate the second response information, and transmit the second response information to the control apparatus. Correspondingly, after obtaining the second response information, the control apparatus can consider that the target yarn spindle enters the branch where the sensing area is located. Further, a sensor (for example, an inductive card reader) is also provided at the initial position of the sensing area in the transportation direction of the transport channel, for example, in the clockwise direction. At this time, when the target yarn spindle is transmitted to the area that the sensor in the sensing area can sense, the sensor in the sensing area will generate a signal, that is, generate the third response information, and transmit the third response information to the control apparatus. Correspondingly, after obtaining the third response information, the control apparatus can consider that the target yarn spindle enters the sensing area, thereby facilitating the subsequent detection process.

Step S606: obtaining the physical attribute feature of the target yarn spindle using the sensor provided in the sensing area.

Step S607: judging whether the number of detections by the counter for the third response information is less than a third threshold. If so, return to step S604; otherwise, execute step S609.

It can be understood that a counter may also be set in practical applications, and the initial number of counts on the counter is set to 0. After the process of detecting whether the second response information of the radio frequency identification corresponding to the target yarn spindle is obtained is executed once, the number of counts on the counter is incremented by one. The counter stops counting for the second response information until it is detected that the number of counts for the second response information is greater than or equal to the second threshold. In this way, the early warning information can be quickly generated when the second response information is not detected for multiple consecutive times, so that the worker can maintain the device in time.

Further, after the counter executes the process of detecting whether the third response information of the radio frequency identification corresponding to the target yarn spindle is obtained once, the number of counts on the counter is incremented by one. The counter stops counting for the third response information until it is detected that the number of counts for the third response information is greater than or equal to the third threshold. In this way, the early warning information can be quickly generated when the third response information is not detected for multiple consecutive times, so that the worker can maintain the device in time.

Here, the second threshold and the third threshold are both empirical values, and the values of them may be the same or different, which is not limited in the solution of the present disclosure.

Step S608: judging whether the number of detections by the counter for the second response information is less than the second threshold. If so, return to step S603; otherwise, execute step S609.

Step S609: generating the early warning information to prompt the worker, to facilitate the worker to perform the device detection.

Figure 6B:
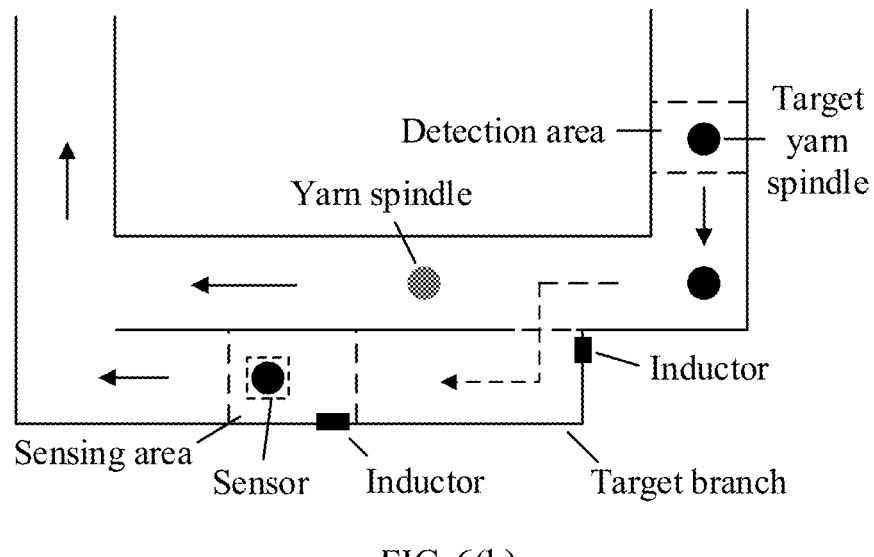

For example, as shown in FIG. 6(b), the yarn spindle located in the detection area is detected to obtain the appearance feature of the detected yarn spindle, such as the diameter of the detected yarn spindle; it is judged whether the diameter of the detected yarn spindle meets the first preset requirement; if so, the standard weight of the standard yarn spindle is directly used as the yarn spindle information of the yarn spindle with the diameter meeting the first preset requirement; otherwise, the yarn spindle with abnormal weight may be used as the target yarn spindle, and the branch that the target yarn spindle needs to pass through is adjusted from the default branch to the target branch, to continue transporting the target yarn spindle. Further, it is detected whether the second response information for the radio frequency identification corresponding to the target yarn spindle is obtained; if so, it is considered that the target yarn spindle has entered the branch where the sensing area is located (that is, the target branch), and it is further detected whether the third response information for the radio frequency identification corresponding to the target yarn spindle is obtained; if so, it is considered that the target yarn spindle has entered the sensing area, and at this time, the weighing sensor provided in the sensing area is started to make the weighing sensor provided in the sensing area enter the working state, so as to obtain the weight of the target yarn spindle based on the weighing sensor in the working state; otherwise, that is, when the third response information for the radio frequency identification corresponding to the target yarn spindle is not obtained, the counter is used to obtain the number of detections for the third response information, and it is judged whether the number of detections for the third response information is less than the third threshold; if so, it is re-detected whether the third response information is obtained; otherwise, the early warning information is generated.

Further, if it is not detected that the second response information for the radio frequency identification corresponding to the target yarn spindle is obtained, the counter is used to obtain the number of detections for the second response information, and it is judged whether the number of detections for the second response information is less than the second threshold; if so, it is re-detected whether the second response information is obtained; otherwise, the early warning information is generated.

To sum up, the control method provided in the solution of the present disclosure have the following advantages over the prior art, specifically including:

(1) Improve the detection efficiency. Compared with the prior art, the solution of the present disclosure uses the target detection model to obtain the appearance feature of the yarn spindle, and determines whether the physical attribute feature of the yarn spindle needs to be detected based on the appearance feature. In this way, the physical attribute features of all yarn spindles can be obtained without detecting each yarn spindle, greatly improving the detection efficiency of the physical attribute features of yarn spindles.

(2) Improve the overall quality of the packaged yarn spindles. The solution of the present disclosure can be applied to the weighing link of automatic packaging of yarn spindles and can obtain the weight of each yarn spindle quickly, laying the foundation for subsequent avoidance of mixing yarn spindles with abnormal weights in packaging, and also laying the foundation for subsequent improvement of the overall quality of the packaged yarn spindles.

(3) More automated. Compared with the case that the mechanical arm grabs the yarn spindle for weighing in the prior art, the solution of the present disclosure can use the detection area and the sensing area on the transport channel to automatically accomplish the complete weighing link of the yarn spindle without human intervention, thus improving the automation degree of the automatic packaging process while saving time, thereby laying the foundation for cost reduction.

Figure 7:
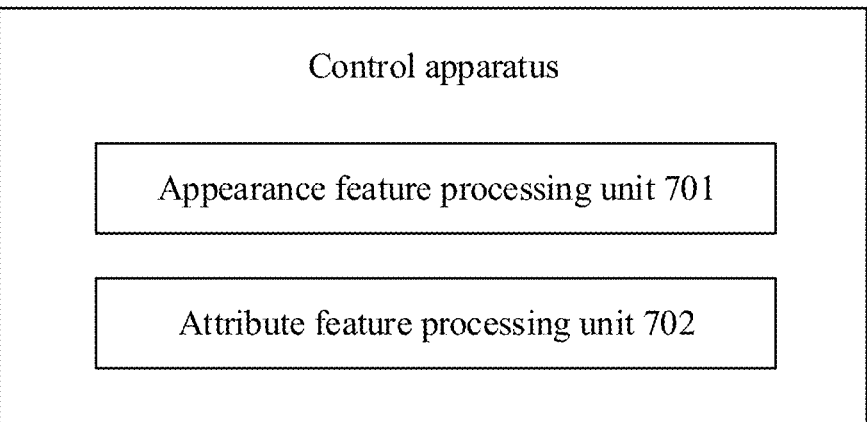
FIG. 7 is a schematic structural diagram of a control apparatus according to an embodiment of the present application.

The solution of the present disclosure further provides a control apparatus, as shown in FIG. 7, including:

an appearance feature processing unit 701 configured to, when determining that a yarn spindle transported on a transport channel enters a detection area, detect the yarn spindle located in the detection area to obtain an appearance feature of the detected yarn spindle; where the transport channel is a channel for transporting yarn spindles in an automatic packaging workshop; and the detection area is at least a partial area on the transport channel; and when the appearance feature of the detected yarn spindle does not meet a first preset requirement, determine the yarn spindle with the appearance feature not meeting the first preset requirement as a target yarn spindle; and an attribute feature processing unit 702 configured to detect a physical attribute feature of the target yarn spindle.

In a specific example of the solution of the present disclosure, the appearance feature processing unit is specifically configured to:

obtain a target image; where the target image contains the yarn spindle located in the detection area;

input the target image into a target detection model to obtain coordinate information of a target point in a target frame, where the target detection model is used to obtain a target frame that frames each yarn spindle located in the detection area in the target image, and determine a coordinate point in the target frame having a preset position relationship with a shape of the framed yarn spindle based on the coordinate information of the target frame; where sides of the target frame have the preset position relationship with the shape of the framed yarn spindle; and a number of target frames is related to a number of yarn spindles located in the detection area in the target image; and obtain the appearance feature of the yarn spindle framed by the target frame based on the coordinate information of the target point in the target frame.

In a specific example of the solution of the present disclosure, the target detection model includes at least a first network layer, a second network layer and a third network layer;

where the first network layer is used to extract an image feature of the target image, and obtain candidate frames for framing each yarn spindle in the target image based on the image feature of the target image;

the second network layer is used to determine first center positions of the candidate frames based on coordinate information of the candidate frames, and select a candidate frame of which a first center position has a position relationship with a preset center position of the detection area satisfying a preset relationship, to obtain the target frame; and the third network layer is used to determine the coordinate information of the target point in the target frame having the preset position relationship with the shape of the framed yarn spindle based on the coordinate information of the target frame.

In a specific example of the solution of the present disclosure, the attribute feature processing unit is specifically configured to:

obtain the physical attribute feature of the target yarn spindle using a sensor provided in a sensing area when determining that the target yarn spindle enters the sensing area;

where the sensing area is at least a partial area on the transport channel and is located downstream of the detection area.

In a specific example of the solution of the present disclosure, the attribute feature processing unit is further configured to perform one of:

before detecting the physical attribute feature of the target yarn spindle, detect whether first response information for a radio frequency identification corresponding to the target yarn spindle is obtained when the detection area and the sensing area are located in a same branch of the transport channel, where the first response information indicates that the target yarn spindle enters the sensing area; and before detecting the physical attribute feature of the target yarn spindle, detect whether second response information for the radio frequency identification corresponding to the target yarn spindle is obtained when the detection area and the sensing area are located in different branches of the transport channel, where the second response information indicates that the target yarn spindle enters a branch where the sensing area is located; and determine that the target yarn spindle enters the sensing area when the second response information for the radio frequency identification corresponding to the target yarn spindle is obtained.

In a specific example of the solution of the present disclosure:

the attribute feature processing unit is further configured to, when the detection area and the sensing area are located in the same branch of the transport channel, generate a first control instruction when the first response information for the radio frequency identification corresponding to the target yarn spindle is obtained, where the first control instruction is used to instruct the sensor provided in the sensing area to enter a working state;

or the attribute feature processing unit is further configured to, when the detection area and the sensing area are located in different branches of the transport channel, generate a first control instruction when the second response information for the radio frequency identification corresponding to the target yarn spindle is obtained, where the first control instruction is used to instruct the sensor provided in the sensing area to enter a working state.

In a specific example of the solution of the present disclosure, the attribute feature processing unit is specifically configured to:

detect whether third response information for the radio frequency identification corresponding to the target yarn spindle is obtained when the second response information for the radio frequency identification corresponding to the target yarn spindle is obtained, where the third response information indicates that the target yarn spindle enters the sensing area; and determine that the target yarn spindle enters the sensing area when detecting that the third response information for the radio frequency identification corresponding to the target yarn spindle is obtained.

In a specific example of the solution of the present disclosure, the attribute feature processing unit is further configured to:

when the detection area and the sensing area are located in different branches of the transport channel, generate a first control instruction when the second response information for the radio frequency identification corresponding to the target yarn spindle is obtained and the third response information for the radio frequency identification corresponding to the target yarn spindle is obtained, where the first control instruction is used to instruct the sensor provided in the sensing area to enter a working state.

In a specific example of the solution of the present disclosure, the attribute feature processing unit is further configured to:

when the detection area and the sensing area are located in different branches of the transport channel, adjust a branch that the target yarn spindle needs to pass through from a default branch to a target branch;

where the default branch represents a branch in the transport channel to transport a yarn spindle with an appearance feature meeting the first preset requirement; and the target branch is the branch where the sensing area is located, and represents a branch in the transport channel to transport a yarn spindle with an appearance feature not meeting the first preset requirement.

In a specific example of the solution of the present disclosure, the attribute feature processing unit is further configured to, after detecting the physical attribute feature of the target yarn spindle, generate a second control instruction for the target yarn spindle when the physical attribute feature of the target yarn spindle does not meet a second preset requirement, where the second control instruction is used to instruct a mechanical arm to grab the target yarn spindle and place the target yarn spindle on a target trolley;

or the attribute feature processing unit is further configured to, after detecting the physical attribute feature of the target yarn spindle, determine the physical attribute feature of the target yarn spindle as yarn spindle information of the target yarn spindle when the physical attribute feature of the target yarn spindle meets the second preset requirement.

In a specific example of the solution of the present disclosure, the appearance feature processing unit is further configured to:

when the appearance feature of the detected yarn spindle meets the first preset requirement, determine a preset physical feature as yarn spindle information of the yarn spindle with the appearance feature meeting the first preset requirement.

For the description of specific functions and examples of the units of the apparatus of the embodiment of the present disclosure, reference may be made to the relevant description of the corresponding steps in the above-mentioned method embodiments, and details are not repeated here.

In the technical solution of the present disclosure, the acquisition, storage and application of the user's personal information involved are in compliance with relevant laws and regulations, and do not violate public order and good customs.

Figure 8:
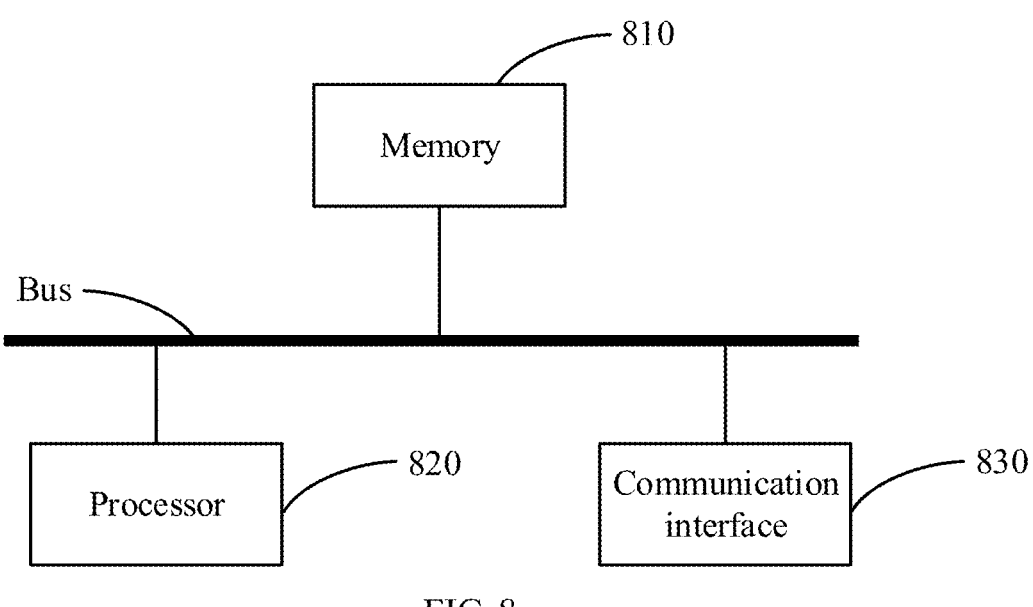
FIG. 8 is a block diagram of an electronic device for implementing the control method of the embodiment of the present disclosure.

FIG. 8 is a structural block diagram of an electronic device according to an embodiment of the present disclosure. As shown in FIG. 8, the electronic device includes: a memory 810 and a processor 820, and the memory 810 stores a computer program that can run on the processor 820. There may be one or more memories 810 and processors 820. The memory 810 may store one or more computer programs, and the one or more computer programs cause the electronic device to perform the method provided in the above method embodiment, when executed by the electronic device. The electronic device may also include: a communication interface 830 configured to communicate with an external device for data interactive transmission.

If the memory 810, the processor 820 and the communication interface 830 are implemented independently, the memory 810, the processor 820 and the communication interface 830 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the bus is represented by only one thick line in FIG. 8, but this thick line does not represent only one bus or only one type of bus.

Optionally, in a specific implementation, if the memory 810, the processor 820 and the communication interface 830 are integrated on one chip, the memory 810, the processor 820 and the communication interface 830 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A control method, comprising:
in a case of it is determined that a yarn spindle transported on a transport channel enters a detection area, detecting the yarn spindle located in the detection area to obtain an appearance feature of the detected yarn spindle; wherein the transport channel is a channel for transporting yarn spindles in an automatic packaging workshop; and the detection area is at least a partial area on the transport channel;
in a case of the appearance feature of the detected yarn spindle does not meet a first preset requirement, determining the yarn spindle with the appearance feature not meeting the first preset requirement as a target yarn spindle; and
detecting a physical attribute feature of the target yarn spindle, comprising:
obtaining the physical attribute feature of the target yarn spindle using a sensor provided in a sensing area, in a case of it is determined that the target yarn spindle enters the sensing area; wherein the sensing area is at least a partial area on the transport channel and is located downstream of the detection area;

wherein before detecting the physical attribute feature of the target yarn spindle, further comprising one of:

detecting whether first response information for a radio frequency identification corresponding to the target yarn spindle is obtained, in a case of the detection area and the sensing area are located in a same branch of the transport channel, wherein the first response information indicates that the target yarn spindle enters the sensing area; or detecting whether second response information for a radio frequency identification corresponding to the target yarn spindle is obtained, in a case of the detection area and the sensing area are located in different branches of the transport channel, wherein the second response information indicates that the target yarn spindle enters a branch where the sensing area is located; and determining that the target yarn spindle enters the sensing area, in a case of the second response information for the radio frequency identification corresponding to the target yarn spindle is obtained.

2. The method of claim 1, wherein detecting the yarn spindle located in the detection area to obtain the appearance feature of the detected yarn spindle, comprises:

obtaining a target image; wherein the target image contains the yarn spindle located in the detection area;

inputting the target image into a target detection model to obtain coordinate information of a target point in a target frame, wherein the target detection model is used to obtain a target frame that frames each yarn spindle located in the detection area in the target image, and determine a coordinate point in the target frame having a preset position relationship with a shape of the framed yarn spindle based on the coordinate information of the target frame; wherein sides of the target frame have the preset position relationship with the shape of the framed yarn spindle; and a number of target frames is related to a number of yarn spindles located in the detection area in the target image; and obtaining the appearance feature of the yarn spindle framed by the target frame based on the coordinate information of the target point in the target frame;

wherein the target detection model comprises at least a first network layer, a second network layer and a third network layer;

wherein the first network layer is used to extract an image feature of the target image, and obtain candidate frames for framing each yarn spindle in the target image based on the image feature of the target image;

the second network layer is used to determine first center positions of the candidate frames based on coordinate information of the candidate frames, and select a candidate frame of which a first center position has a position relationship with a preset center position of the detection area satisfying a preset relationship, to obtain the target frame; and the third network layer is used to determine the coordinate information of the target point in the target frame having the preset position relationship with the shape of the framed yarn spindle based on the coordinate information of the target frame.

3. The method of claim 1, wherein in the case of the detection area and the sensing area are located in the same branch of the transport channel, the method further comprises: generating a first control instruction in a case of the first response information for the radio frequency identification corresponding to the target yarn spindle is obtained, wherein the first control instruction is used to instruct the sensor provided in the sensing area to enter a working state.

4. The method of claim 1, wherein in the case of the detection area and the sensing area are located in the different branches of the transport channel, the method further comprises: generating a first control instruction in a case of the second response information for the radio frequency identification corresponding to the target yarn spindle is obtained, wherein the first control instruction is used to instruct the sensor provided in the sensing area to enter a working state.

5. The method of claim 1, wherein determining that the target yarn spindle enters the sensing area in the case of the second response information for the radio frequency identification corresponding to the target yarn spindle is obtained, comprises:

detecting whether third response information for the radio frequency identification corresponding to the target yarn spindle is obtained in the case of the second response information for the radio frequency identification corresponding to the target yarn spindle is obtained, wherein the third response information indicates that the target yarn spindle enters the sensing area; and determining that the target yarn spindle enters the sensing area in a case of it is detected that the third response information for the radio frequency identification corresponding to the target yarn spindle is obtained.

6. The method of claim 5, wherein in the case of the detection area and the sensing area are located in the different branches of the transport channel, the method further comprises:

generating a first control instruction in a case of the second response information for the radio frequency identification corresponding to the target yarn spindle is obtained and the third response information for the radio frequency identification corresponding to the target yarn spindle is obtained, wherein the first control instruction is used to instruct the sensor provided in the sensing area to enter a working state.

7. The method of claim 1, wherein in the case of the detection area and the sensing area are located in the different branches of the transport channel, the method further comprises:

adjusting a branch that the target yarn spindle needs to pass through from a default branch to a target branch;

wherein the default branch represents a branch in the transport channel to transport a yarn spindle with an appearance feature meeting the first preset requirement; and the target branch is the branch where the sensing area is located, and represents a branch in the transport channel to transport a yarn spindle with an appearance feature not meeting the first preset requirement.

8. The method of claim 1, after detecting the physical attribute feature of the target yarn spindle, further comprising:

generating a second control instruction for the target yarn spindle in a case of the physical attribute feature of the target yarn spindle does not meet a second preset requirement, wherein the second control instruction is used to instruct a mechanical arm to grab the target yarn spindle and place the target yarn spindle on a target trolley.

9. The method of claim 1, after detecting the physical attribute feature of the target yarn spindle, further comprising:

determining the physical attribute feature of the target yarn spindle as yarn spindle information of the target yarn spindle in a case of the physical attribute feature of the target yarn spindle meets the second preset requirement.

10. The method of claim 1, further comprising:

in a case of the appearance feature of the detected yarn spindle meets the first preset requirement, determining a preset physical feature as yarn spindle information of the yarn spindle with the appearance feature meeting the first preset requirement.

11. An electronic device, comprising:

at least one processor; and a memory connected in communication with the at least one processor;

wherein the memory stores an instruction executable by the at least one processor, and the instruction, when executed by the at least one processor, enables the at least one processor to execute:

in a case of it is determined that a yarn spindle transported on a transport channel enters a detection area, detecting the yarn spindle located in the detection area to obtain an appearance feature of the detected yarn spindle; wherein the transport channel is a channel for transporting yarn spindles in an automatic packaging workshop; and the detection area is at least a partial area on the transport channel;

in a case of the appearance feature of the detected yarn spindle does not meet a first preset requirement, determining the yarn spindle with the appearance feature not meeting the first preset requirement as a target yarn spindle; and detecting a physical attribute feature of the target yarn spindle, comprising:

obtaining the physical attribute feature of the target yarn spindle using a sensor provided in a sensing area, in a case of it is determined that the target yarn spindle enters the sensing area; wherein the sensing area is at least a partial area on the transport channel and is located downstream of the detection area;

wherein before detecting the physical attribute feature of the target yarn spindle, the instruction enables the at least one processor to execute one of:

detecting whether first response information for a radio frequency identification corresponding to the target yarn spindle is obtained, in a case of the detection area and the sensing area are located in a same branch of the transport channel, wherein the first response information indicates that the target yarn spindle enters the sensing area; or detecting whether second response information for a radio frequency identification corresponding to the target yarn spindle is obtained, in a case of the detection area and the sensing area are located in different branches of the transport channel, wherein the second response information indicates that the target yarn spindle enters a branch where the sensing area is located; and determining that the target yarn spindle enters the sensing area, in a case of the second response information for the radio frequency identification corresponding to the target yarn spindle is obtained.

12. The electronic device of claim 11, wherein the instruction, when executed by the at least one processor, enables the at least one processor to execute:

obtaining a target image; wherein the target image contains the yarn spindle located in the detection area;

inputting the target image into a target detection model to obtain coordinate information of a target point in a target frame, wherein the target detection model is used to obtain a target frame that frames each yarn spindle located in the detection area in the target image, and determine a coordinate point in the target frame having a preset position relationship with a shape of the framed yarn spindle based on the coordinate information of the target frame; wherein sides of the target frame have the preset position relationship with the shape of the framed yarn spindle; and a number of target frames is related to a number of yarn spindles located in the detection area in the target image; and obtaining the appearance feature of the yarn spindle framed by the target frame based on the coordinate information of the target point in the target frame;

wherein the target detection model comprises at least a first network layer, a second network layer and a third network layer;

wherein the first network layer is used to extract an image feature of the target image, and obtain candidate frames for framing each yarn spindle in the target image based on the image feature of the target image;

the second network layer is used to determine first center positions of the candidate frames based on coordinate information of the candidate frames, and select a candidate frame of which a first center position has a position relationship with a preset center position of the detection area satisfying a preset relationship, to obtain the target frame; and the third network layer is used to determine the coordinate information of the target point in the target frame having the preset position relationship with the shape of the framed yarn spindle based on the coordinate information of the target frame.

13. The electronic device of claim 11, wherein in the case of the detection area and the sensing area are located in the same branch of the transport channel, the instruction enables the at least one processor to execute: generating a first control instruction in a case of the first response information for the radio frequency identification corresponding to the target yarn spindle is obtained, wherein the first control instruction is used to instruct the sensor provided in the sensing area to enter a working state.

14. The electronic device of claim 11, wherein in the case of the detection area and the sensing area are located in the different branches of the transport channel, the instruction enables the at least one processor to execute: generating a first control instruction in a case of the second response information for the radio frequency identification corresponding to the target yarn spindle is obtained, wherein the first control instruction is used to instruct the sensor provided in the sensing area to enter a working state.

15. The electronic device of claim 11, wherein determining that the target yarn spindle enters the sensing area in the case of the second response information for the radio frequency identification corresponding to the target yarn spindle is obtained, comprises:

detecting whether third response information for the radio frequency identification corresponding to the target yarn spindle is obtained in the case of the second response information for the radio frequency identification corresponding to the target yarn spindle is obtained, wherein the third response information indicates that the target yarn spindle enters the sensing area; and determining that the target yarn spindle enters the sensing area in a case of it is detected that the third response information for the radio frequency identification corresponding to the target yarn spindle is obtained.

16. A non-transitory computer-readable storage medium storing a computer instruction thereon, wherein the computer instruction is used to cause a computer to execute:

in a case of it is determined that a yarn spindle transported on a transport channel enters a detection area, detecting the yarn spindle located in the detection area to obtain an appearance feature of the detected yarn spindle; wherein the transport channel is a channel for transporting yarn spindles in an automatic packaging workshop; and the detection area is at least a partial area on the transport channel;

in a case of the appearance feature of the detected yarn spindle does not meet a first preset requirement, determining the yarn spindle with the appearance feature not meeting the first preset requirement as a target yarn spindle; and detecting a physical attribute feature of the target yarn spindle, comprising:

obtaining the physical attribute feature of the target yarn spindle using a sensor provided in a sensing area, in a case of it is determined that the target yarn spindle enters the sensing area; wherein the sensing area is at least a partial area on the transport channel and is located downstream of the detection area;

wherein before detecting the physical attribute feature of the target yarn spindle, the computer instruction causes the computer to execute one of:

detecting whether first response information for a radio frequency identification corresponding to the target yarn spindle is obtained, in a case of the detection area and the sensing area are located in a same branch of the transport channel, wherein the first response information indicates that the target yarn spindle enters the sensing area; or detecting whether second response information for a radio frequency identification corresponding to the target yarn spindle is obtained, in a case of the detection area and the sensing area are located in different branches of the transport channel, wherein the second response information indicates that the target yarn spindle enters a branch where the sensing area is located; and determining that the target yarn spindle enters the sensing area, in a case of the second response information for the radio frequency identification corresponding to the target yarn spindle is obtained.

17. The non-transitory computer-readable storage medium of claim 16, wherein the computer instruction is used to cause the computer to execute:

obtaining a target image; wherein the target image contains the yarn spindle located in the detection area;

inputting the target image into a target detection model to obtain coordinate information of a target point in a target frame, wherein the target detection model is used to obtain a target frame that frames each yarn spindle located in the detection area in the target image, and determine a coordinate point in the target frame having a preset position relationship with a shape of the framed yarn spindle based on the coordinate information of the target frame; wherein sides of the target frame have the preset position relationship with the shape of the framed yarn spindle; and a number of target frames is related to a number of yarn spindles located in the detection area in the target image; and obtaining the appearance feature of the yarn spindle framed by the target frame based on the coordinate information of the target point in the target frame;

wherein the target detection model comprises at least a first network layer, a second network layer and a third network layer;

wherein the first network layer is used to extract an image feature of the target image, and obtain candidate frames for framing each yarn spindle in the target image based on the image feature of the target image;

the second network layer is used to determine first center positions of the candidate frames based on coordinate information of the candidate frames, and select a candidate frame of which a first center position has a position relationship with a preset center position of the detection area satisfying a preset relationship, to obtain the target frame; and the third network layer is used to determine the coordinate information of the target point in the target frame having the preset position relationship with the shape of the framed yarn spindle based on the coordinate information of the target frame.

18. The non-transitory computer-readable storage medium of claim 16, wherein in the case of the detection area and the sensing area are located in the same branch of the transport channel, the computer instruction causes the computer to execute: generating a first control instruction in a case of the first response information for the radio frequency identification corresponding to the target yarn spindle is obtained, wherein the first control instruction is used to instruct the sensor provided in the sensing area to enter a working state.

19. The non-transitory computer-readable storage medium of claim 16, wherein in the case of the detection area and the sensing area are located in the different branches of the transport channel, the computer instruction causes the computer to execute: generating a first control instruction in a case of the second response information for the radio frequency identification corresponding to the target yarn spindle is obtained, wherein the first control instruction is used to instruct the sensor provided in the sensing area to enter a working state.

20. The non-transitory computer-readable storage medium of claim 16, wherein determining that the target yarn spindle enters the sensing area in the case of the second response information for the radio frequency identification corresponding to the target yarn spindle is obtained, comprises:

detecting whether third response information for the radio frequency identification corresponding to the target yarn spindle is obtained in the case of the second response information for the radio frequency identification corresponding to the target yarn spindle is obtained, wherein the third response information indicates that the target yarn spindle enters the sensing area; and determining that the target yarn spindle enters the sensing area in a case of it is detected that the third response information for the radio frequency identification corresponding to the target yarn spindle is obtained.

* * * * *